Patented Sept. 23, 1941

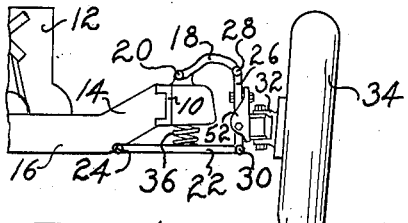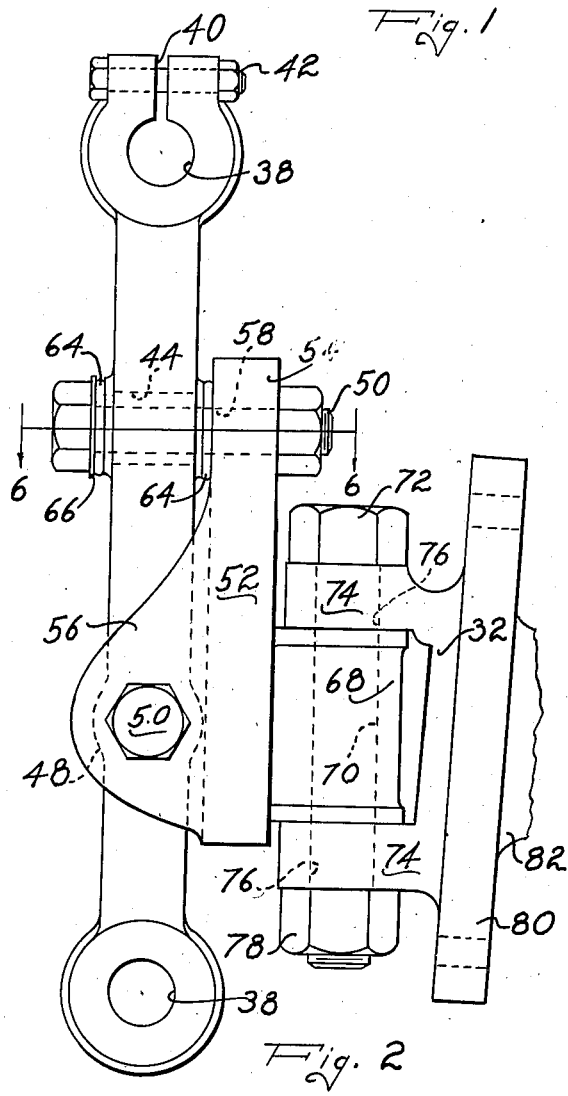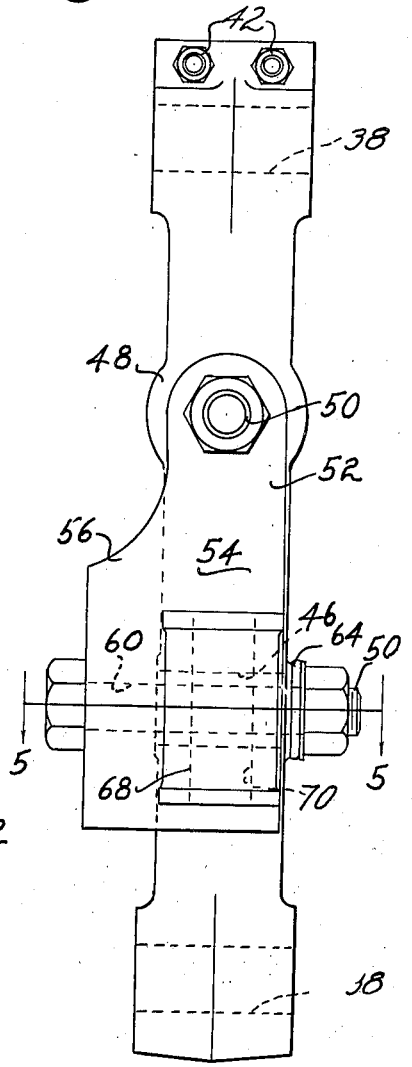

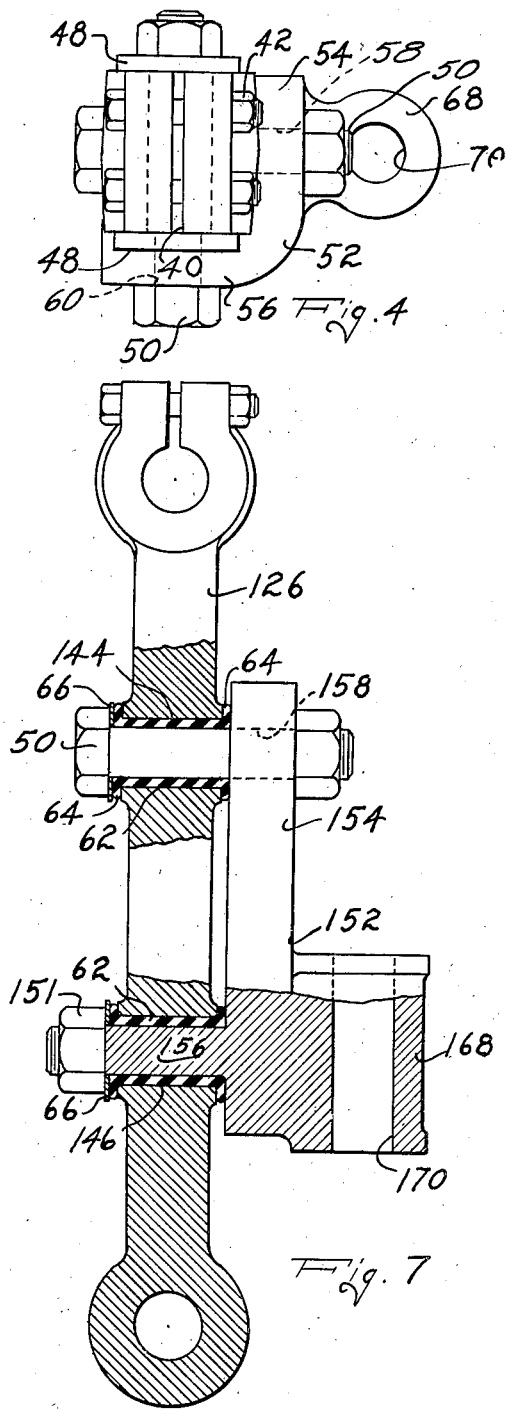
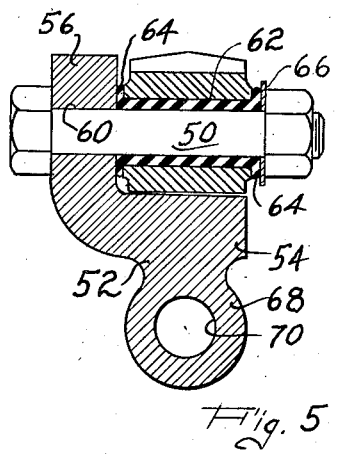
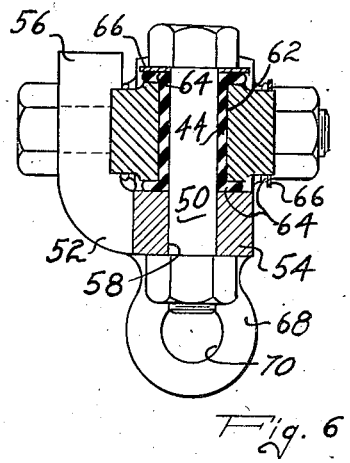

2,256,749

UNITED STATES PATENT OFFICE 2,256,749

AUTOMOTIVE SUSPENSION

Ross H. Phelps, Kenosha, Wis., assignor to Nash-Kelvinator Corporation, Kenosha, Wis., a corporation of Maryland Application May 18, 1940, Serial No. 335,989

5 Claims. (Cl. 280—96.2)

This invention relates to automotive wheel suspensions and has particular reference to means for insulating the frame and body of the automobile from the vibrations of the wheels.

It is an object of this invention to provide novel means for insulating the steering knuckle of an automobile from the rest of the car.

It is another object of this invention to provide an insulated steering knuckle which will be sufficiently rigid so as not to affect the steering properties of the car.

It is another object of this invention to provide a rubber mounted steering knuckle.

It is another object of this invention to provide a wheel suspension which will be quieter in operation than those known heretofore.

Other objects and advantages of my invention will be apparent from a consideration of the following description and claims and attached drawings of which there are two sheets and in which Figure 1 represents a front elevation of an automotive wheel suspension;

Figure 2 represents an enlarged front elevation of the steering knuckle support arm and steering knuckle illustrated in Figure 1;

Figure 3 represents a side elevation of the support arm illustrated in Figure 2;

Figure 4 represents a top plan view of the support arm illustrated in Figures 2 and 3;

Figure 5 represents a section taken on a plane indicated by the line 5—5 in Figure 3 and looking in the direction of the arrows;

Figure 6 represents a section taken along a plane indicated by the line 6—6 in Figure 2 and looking in the direction of the arrows; and, Figure 7 represents a side elevation, partially broken away, of a modified type of my invention.

In Figure 1 I have illustrated an automotive wheel suspension of the type known as a parallel arm suspension. The frame 10 which supports the engine 12 is provided with a cross member 14 having a bent down center portion 16. An upper control arm 18 is pivoted to the frame at 20 and a lower control arm 22 is pivoted to the bent down portion 16 of the cross member 14 at 24. The outer ends of the control arms 18 and 22 are pivoted to the steering knuckle support arm 26 at 28 and 30 respectively. The support arm 26 is arranged to support the steering knuckle 32 which supports the wheel 34 in the usual manner. Road shocks caused by the wheel 34 passing over obstructions in the road are cushioned by the coil spring 36 which is positioned between the frame cross members 14 and the lower control arm 22. Suitable shock absorbers may also be provided to assist the spring and absorb rebound. However, the spring 36 and shock absorber are too stiff and slow to react to many of the higher frequency vibrations of the wheels with the result that these vibrations are transmitted to the automobile through the spring 36 and the control arms 18 and 22. My invention deals with means for mounting the support arm 26 and steering knuckle 32 which will prevent this vibration from reaching the frame 10.

The support arm 26 is apertured at each end at 38 to receive the pivot pins 28 and 30 which support the arm, the top of the arm being slotted at 40 and provided with bolts 42 for clamping the walls of the aperture 38 tightly around the pin 28. Below the upper aperture 38 the support arm 26 is provided with an aperture 44 extending through the arm at right angles to the apertures 38. Between the aperture 44 and the lower aperture 38 is a fourth aperture 46 which extends parallel to the apertures 38 and at right angles to the aperture 44. The support arm is widened in the planes of the apertures 44 and 46 as indicated at 48 to keep the strength of the arm approximately equal at all sections.

Secured to the support arm 26 by means of bolts 50 passed through the apertures 44 and 46 is a king pin support bracket 52. Bracket 52 has a side plate 54 from the lower portion of which an ear 56 is bent at right angles around the front of the support arm 26. The bracket 52 is conveniently fabricated by forging and the top of the side plate 54 is apertured at 58 to pass the bolt 50 which is passed through the aperture 44 in the support arm. The ear 56 is apertured at 60 to pass the bolt 50 which goes through the aperture 46 in the arm 26.

The apertures 44 and 46 in the support arm 26 are larger in diameter than the shanks of the bolts 50 so that there is room for sleeves 62 of rubber or some similar deformable material to be placed around bolts 50 (see Figures 5 and 6). It will be noted that the sleeves 62 have outturned flanges 64 at each end, which flanges insulate the bracket 52 from the support arm 26 and insulate washers 66 from the bracket 52. Washers 66 are provided under each of the bolts 50 that would otherwise contact the flanges 64. The support arm 26 is thus entirely insulated by rubber from the king pin bracket 52 and the bolts 50 which hold the bracket 52 to the arm 26.

Formed on the lower portion of the side plate 54 of the king pin bracket 52, as by forging therewith, is a boss 68 which is vertically apertured at 70 to receive the king pin 72. The top and bottom of the boss 68 are machined flat in plates normal to the aperture 70. The yoke arms 74 of the steering knuckle 32 fit closely against these surfaces (see Figure 2). The yoke arms 74 are apertured at 76 to pass the king pin 72 which is secured in place by the nut 78 screwed on the lower end of the king pin 72. The steering knuckle 32 carries the apertured plate 80, to which a backing plate for a brake drum may be bolted, and the spindle 82 on which the wheel 34 is mounted in the usual manner. Suitable connections (not shown) are provided for connecting the steering knuckle 32 to the steering linkage of the automobile.

In operation, the rubber sleeves 62 will absorb the vibrations and noises emanating from the wheel 34 which are of too high a frequency to be absorbed by the spring 36. Attention is called to the fact that the bolts 50 are positioned at right angles. This gives support to the steering knuckle in two directions and increases its resistance to twisting about the support arm 26 as the rubber sleeves are deformed.

In the modified type of structure shown in Figure 7, the steering knuckle support arm 126 is the same as the preferred arm 26 except that the apertures 144 and 146 are parallel, both opening in the side of the support arm. The king pin support bracket 152 is formed as a single plate 154 with a lug 156 formed integrally with it and extending at right angles from the inner side of the plate just opposite the boss 168. The lug 156 is threaded on the end to receive a nut 151 and takes the place of the lower bolt 50 used in the first example of my invention. The upper end of the plate 154 is apertured at 158 to receive a bolt 50 the same as in Figures 1 through 6, and the boss 168 is apertured at 170 in the same manner and for the same purpose as boss 68. Rubber sleeves 62 are positioned around the bolt 50 and lug 156 to insulate them from the support arm 126. The sleeves 62 have the same flanges 64 which separate the plate 154 from the arm 126 and the nut 151 and head of bolt 50 from the arm 126. I have also provided washers 66 under the nut 151 and the head of the bolt 50 to bear against the flanges 64. The steering knuckle support arm 126 and king pin support bracket 152 function in the same manner as the arm 26 and bracket 52 to absorb noise and vibration which would otherwise be transmitted from the wheel to the frame.

While I have described my invention in some detail, I intend this description to be an example only and not limiting on my invention to which I make the following claims:

1. A steering knuckle support arm comprising an arm having vertically spaced sections of enlarged cross section defining apertures extending at right angles to one another, a steering knuckle engaging member having a side plate, a flange formed on said side plate at right angles thereto, said flange and side plate defining a pair of apertures registering with the apertures in said arm, bolts extending through said apertures for joining said arm and said steering knuckle engaging member, and rubber sleeves positioned in the apertures of said arm, said sleeves having flanges separating said arm from said bolts and said steering knuckle engaging member.

2. A steering knuckle support arm comprising an arm having vertically spaced sections of enlarged cross section defining apertures extending at right angles to one another, a steering knuckle engaging member having a side plate, a flange formed on said side plate at right angles thereto, said flange and side plate defining a pair of apertures registering with the apertures in said arm, bolts extending through said apertures for joining said arm and said steering knuckle engaging member, rubber sleeves positioned in the apertures of said arm, said sleeves having flanges separating said arm from said bolts and said steering knuckle engaging member, and means for supporting a steering knuckle formed on said side plate.

3. A steering knuckle support arm comprising an arm having vertically spaced sections of enlarged cross section defining apertures extending at right angles to one another, a steering knuckle engaging member having a side plate, a flange formed on said side plate, said side plate and flange defining a pair of apertures registering with the apertures in said arm, bolts extending through said apertures for joining said arm and said steering knuckle engaging member, rubber sleeves positioned in the apertures of said arm, said sleeves having flanges separating said arm from said bolts and said steering knuckle engaging member, and a boss for supporting a king pin formed on said side plate opposite the lower of said apertures.

4. A steering knuckle support arm comprising an arm defining a pair of vertically spaced apertures, a steering knuckle engaging member having a side plate, a flange formed on one edge of said side plate, said flange and side plate defining a second pair of apertures registering with the apertures in said arm, bolts extending through said apertures for joining said arm and said steering knuckle engaging member, and means for supporting a road wheel carried by said side plate.

5. A steering knuckle support arm comprising a strut having a generally retangular cross section, said strut defining an aperture near one end thereof and a second aperture near the other end thereof extending at right angles with respect to the first aperture, a steering knuckle engaging member having a side plate, a flange formed on said side plate, said flange and said side plate defining apertures arranged to register with the apertures in said strut, bolts extending through said apertures in said strut, side plate and flange to hold said strut and steering knuckle engaging member together, and a boss arranged to support a king pin formed on said side plate below the aperture in said side plate.

ROSS H. PHELPS.